United States Patent [19]
Upmeier

[11] 3,762,853
[45] Oct. 2, 1973

[54] COOLING MEANS FOR TUBULAR PLASTICS FILM EXTRUDED IN THE FORM OF A BUBBLE THROUGH AN ANNULAR NOZZLE ORIFICE

[75] Inventor: Hartmut Upmeier, Tecklenburg, Germany

[73] Assignee: Windmoller & Holscher, Westphalia, Germany

[22] Filed: June 29, 1971

[21] Appl. No.: 157,938

[30] Foreign Application Priority Data
June 30, 1970  Germany.................. P 20 32 346.0

[52] U.S. Cl. ............................................. 425/326
[51] Int. Cl. ............................................... B29f 3/00
[58] Field of Search ................... 425/66, 72, 73, 74, 425/317

[56] References Cited
UNITED STATES PATENTS

| | | |
|---|---|---|
| 3,170,011 | 2/1965 | Cheney et al................... 425/326 X |
| 2,668,323 | 2/1954 | Johnson.......................... 425/326 X |
| 2,632,206 | 3/1953 | Pierce............................. 425/326 X |
| 2,641,022 | 6/1953 | Kress.............................. 425/326 X |
| 2,966,700 | 1/1961 | Dyer et al...................... 425/326 X |
| 3,064,905 | 11/1962 | Bonner........................... 425/326 X |
| 3,088,167 | 5/1963 | Corbett........................... 425/326 X |
| 3,090,998 | 5/1963 | Heisterkamp et al.......... 425/326 X |

*Primary Examiner*—J. Spencer Overholser
*Assistant Examiner*—Michael O. Sutton
*Attorney*—Fleit, Gipple & Jacobson

[57] ABSTRACT

In a blowhead for making tubular plastics film by extruding a tubular film bubble through a nozzle orifice, interior air cooling and inflating means for the bubble comprise an air inlet passage extending axially through the blowhead, an air outlet tube which is disposed centrally through the inlet passage, projects into the bubble with one end and has a suction fan connected to its other end, a first guide ring around the outlet tube for directing air from the inlet passage onto the bubble wall, and at least one additional guide ring downstream of the first ring and disposed around the outlet tube at a spacing therefrom to define an annular aperture through which some of the air can flow further into the bubble.

9 Claims, 1 Drawing Figure

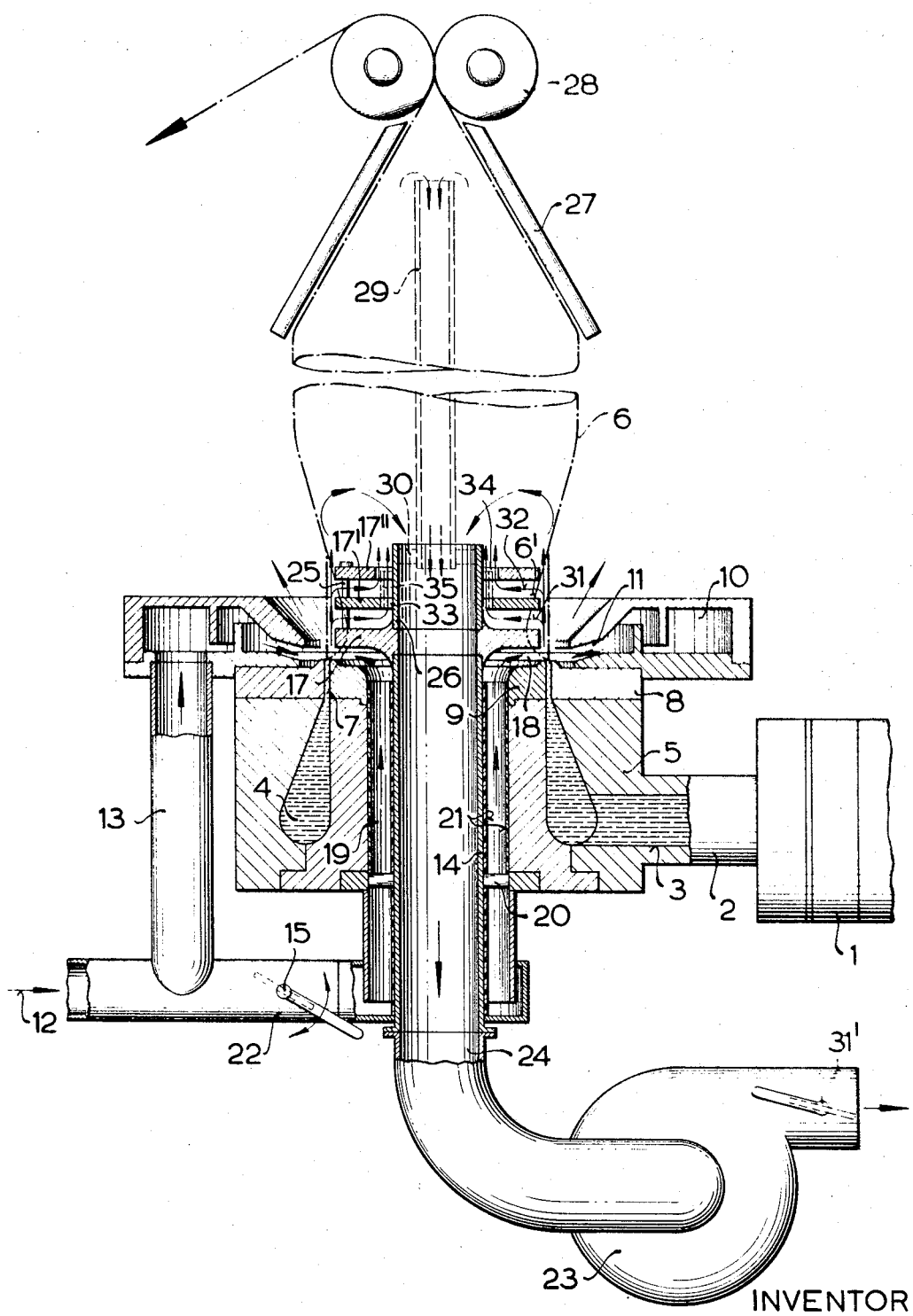

COOLING MEANS FOR TUBULAR PLASTICS FILM EXTRUDED IN THE FORM OF A BUBBLE THROUGH AN ANNULAR NOZZLE ORIFICE

The invention relates to cooling means for tubular plastics film extruded in the form of a bubble through an annular nozzle orifice of a blowhead which has inlet and outlet conduits extending axially through it for the passage of interior cooling and inflating air for the bubble.

Such cooling means for the interior of the bubble can, in conjunction with the use of exterior cooling air of appropriate intensity, be effective in rapidly cooling the plastics film without detrimentally influencing the uniform thickness and interior surface of the film. However, the cooling effect is of course limited by the amount of air that can be introduced to and withdrawn from the tubular film bubble through the axial conduits in the blowhead. Any build-up of air within the bubble would cause it to stretch excessively and make it impossible to maintain a constant film thickness and diameter. The speed of production of the film, which is governed by the cooling rate, therefore also has an upper limit and the present invention aims to increase this upper limit by permitting still more intensive cooling than hitherto without affecting the close tolerances to which the film has to be made.

According to the invention, there is provided a blowhead for tubular plastics film, comprising an annular nozzle orifice for forming a tubular film bubble, an inlet passage extending axially of the nozzle orifice for interior cooling and inflating air for the bubble, an air outlet tube disposed centrally through the inlet passage and projecting into the bubble, suction means connected to the outlet tube, a first guide ring for the interior cooling air, said first guide ring surrounding the outlet tube and being adapted to direct the interior air from the inlet passage onto the inside of the bubble wall, and one or more additional guide rings for the interior cooling air disposed around the outlet tube, the guide rings being axially spaced from one another and the additional guide ring or rings being provided near the outlet tube with an aperture for air flow therethrough.

By reason of the suction means, preferably in the form of a suction fan, the throughput of interior cooling air can now be much higher than hitherto, i.e., higher than if the air is introduced to the bubble under pressure and simply allowed to flow out again under the same pressure. However, the mere addition of a suction fan to cooling equipment of the kind described in our German Pat. application No. P 20 08 597.6 would give rise to undesirable side effects in so far that the soft film extruded through the nozzle orifice would be subjected to strong vibrations and fluttering under the increased speed and turbulence of the interior cooling air. It is for this reason that the invention makes provision for at least one additional guide ring which is disposed around the outlet tube and is provided with an aperture through which some of the air can flow further into the bubble. It has been found that such division of the air flow effectively stabilises the soft film from the inside so that the intensity of exterior cooling air can also be considerably increased.

Both or all of the guide rings preferably have substantially the same diameter which may be equal to the diameter of the nozzle orifice. If the spacing between the guide rings is adjustable, the distribution of air within the bubble can be varied within wide limits. The aforementioned aperture in the or each additional guide ring is preferably bounded by the outlet tube and the internal circumference of the ring. If there are two or more additional guide rings, they are preferably provided with successively larger air flow apertures as viewed in the dirction of air flow. By appropriately selecting the spacing between the guide rings and the size of the aperture in the or each additional guide ring it is easy to arrive at an arrangement with which a maximum of interior cooling air passes between the additional guide rings and the bubble wall to intensify the high speed cooling of the bubble, the flow of air through the apertures in the additional guide rings being only sufficiently large to avoid detrimental turbulence and vibration of the bubble.

To minimise a build-up of heat at the downstream end of the bubble where the film has solidified and is flattened by being passed through the nip of two rollers, a suction tube may be provided to dip into the inlet end of the outlet tube on the jet pump principle and to form an extension of the outlet tube through the bubble.

The suction fan may be designed for surplus capacity and include an auxiliary throttle valve in its suction line, for example on the air output side of the fan, a main throttle valve for regulating the degree to which the bubble is inflated being provided in an air supply pipe connected to the inlet passage. The auxiliary throttle valve makes it possible to control the air quantity so that the main throttle valve can be almost completely open, whereby a maximum cooling effect is achieved, unless particularly sensitive tubular films are being made, in which case the main throttle valve can be partially closed to reduce the flow of air.

An example of the invention is illustrated in the accompanying diagrammatic drawing which shows a part-sectional side elevation of a blowhead.

An extruder 1 impels molten plastics material through a passage 3 in a conduit 2 to reach a distributor 4 which is illustrated in simplified form and is located in a blowhead housing 5. A nozzle orifice 7 for forming a tubular film 6 in the form of a bubble is defined between outer and inner nozzle rings 8 and 9, respectively. The ring 8 supports a cooling ring 10 which contains an annular passage 11 for directing exterior cooling air onto the film 6 immediately above the nozzle orifice 7.

Cooling air for both the exterior and interior of the bubble of film 6 is introduced through a supply pipe 22 in the direction of the arrow 12, the exterior cooling air being tapped off through a pipe 13 leading to the ring 10. Downstream of the pipe 13, the pipe 22 is provided with main throttle valve 15 for the interior cooling air. This throttle valve is used to control the amount by which the bubble of film 6 is inflated. The interior cooling air passes from the pipe 22 axially upwardly through the blowhead into a radially outwardly directed nozzle orifice 18 disposed opposite the air outlet of the passage 11 for exterior cooling air. The lower side of the orifice 18 is bounded by the nozzle ring 9; the interior cooling air therefore sweeps over the ring 9 and keeps it cool. The upper side of the orifice 18 is bounded by a guide ring 17.

The thick vertical chain-dotted lines extending from the nozzle orifice 7 in the drawing indicate that the film 6 is first extruded with a substantially constant diameter. Without the supply of interior cooling air in the manner described above, the film would undergo a reduction in diameter after leaving the orifice 7, as shown by the constriction 6' in thin chain-dotted lines.

Interior cooling air leaves the bubble of film 6 axially of the blowhead through an outlet tube 14 which is supported in the blowhead housing 5 by means of streamlined struts 20 and which, together with the housing 5, defines an annular passage 19 through which the interior cooling air flows between the pipe 22 and the orifice 18. Heat insulating linings 21 in the housing 5 and around the tube 14 minimise heating of the incoming cooling air in the passage 19. The cooling ring 10 for exterior air and the guide ring 17 for the interior air are readily replaceable so that the size of the orifice 18 and of the air outlet from the passage 11 can be altered and the oppositely directed streams of air can be kept equal.

The outlet tube 14 for interior cooling air is connected to a suction fan 23 through a conduit 24. To sub-divide the inflowing interior cooling air after it has swept past the guide ring 17 there are two additional guide rings 17', 17" which are supported by thin bolts 25 from the guide ring 17, have the same diameter as the guide ring 17 and surround an extension 26 of the tube 14 projecting into the bubble. Each additional guide ring defines with the extension 26 an annular aperture 33 or 34 through which some of the interior cooling air can flow as indicated by the arrows 31 and 32, respectively. The internal diameters of the additional guide rings 17' and 17" increase in size in a downstream direction so that the part-streams 31 and 32 can be successively combined again and jointly flow through the aperture 34. However, it is also possible to keep the part-streams 31 and 32 separate by means of a tubular wall 35 around the outlet tube extension 26. If still further additional guide rings are provided around an appropriately longer tube extension 26, they will preferably have successively larger annular apertures and the tubular wall 35 (if provided) will extend up to the last additional guide ring, with further tubular walls being provided if so desired.

A build-up of heat in the region of flattening plates 27 for the tubular film 6 leading to haul-off rollers 28 can be avoided by providing the outlet tube extension 26 with a still further extension 29 which is of smaller diameter and is mounted in the inlet end of the extension 26 by means of streamlined holders 30. The extension 29 co-operates with the extension 26 on the jet pump principle and permits interior cooling air to enter the tube 14 from between the extensions 26 and 29 as well as through the extension 29 without giving rise to any alterations in the air flow conditions as regulated by the guide rings 17, 17' and 17".

Without departing from the underlying inventive concept, it is also possible to use the tubular extension 29 to introduce relatively small quantities of fresh cooling air in the vicinity of the haul-off rollers 28. This is done by lengthening the extension 29 so that it extends downwardly through the tube 14 and opens into the pipe 22 downstream of the throttle valve 15. Further, it would be useful to design the suction fan for surplus capacity and provide an auxiliary throttle valve 31 in its suction line, for example on the air output side of the fan, whereby the amount of interior cooling air can be regulated so that the main throttle valve 15 can remain about 90° percent open to achieve a maximum cooling effect, unless the film 6 is particularly sensitive, in which case the amount of inflowing interior cooling air can be throttled down.

I claim:

1. A blowhead for tubular plastics film, comprising an annular nozzle orifice for forming a tubular film bubble, an inlet passage extending axially of said nozzle orifice and adapted to introduce interior cooling and inflating air into said bubble, an air outlet tube disposed centrally of said inlet passage and projecting into said bubble, suction means operatively connected to said outlet tube, a first guide ring for said interior cooling air, said first guide ring surrounding said outlet tube and adapted to direct said interior cooling air from said inlet passage onto the inside of the bubble wall adjacent to said nozzle orifice and at least one additional guide ring for said interior cooling air disposed around said outlet tube and downstream of said nozzle orifice, said guide rings being axially spaced from one another and said at least one additional guide ring being provided near the outlet tube with an air flow aperture.

2. A blowhead according to claim 1, wherein said guide rings have substantially equal outside diameters.

3. A blowhead according to claim 1, wherein the outside diameter of each of said guide rings is substantially equal to the diameter of said nozzle orifice.

4. A blowhead according to claim 1, wherein the spacing between said guide rings is adjustable.

5. A blowhead according to claim 1, wherein said aperture in each of said at least one additional guide rings is bounded by said outlet tube and the internal circumference of said guide ring.

6. A blowhead according to claim 5, wherein there are at least two additional guide rings having successively larger air flow apertures in the direction of flow of the interior cooling air.

7. A blowhead according to claim 6, wherein the air flow through the aperture of one of said additional guide rings is separated from the air flow through the aperture of the other of said additional guide rings located downstream thereof by a tubular wall surrounding said outlet tube.

8. A blowhead according to claim 1 inlcuding a suction tube protruding into the inlet end of said outlet tube and operating on the jet pump principle and forming an extension of said outlet tube through the film bubble.

9. A blowhead according to claim 1, including an air supply pipe connected to the inlet end of said inlet passage, a throttle valve positioned in said air supply pipe, and wherein said suction means comprise a suction fan having surplus capacity and an auxiliary throttle valve provided in the suction line of said fan.

* * * * *